(12) United States Patent
Zhang et al.

(10) Patent No.: US 9,491,087 B1
(45) Date of Patent: Nov. 8, 2016

(54) DEVICES AND METHODS FOR FORWARDING INFORMATION BASE AGGREGATION

(71) Applicants: THE ARIZONA BOARD OF REGENTS ON BEHALF OF THE UNIVERSITY OF ARIZONA, Tucson, AZ (US); THE UNIVERSITY OF MEMPHIS RESEARCH FOUNDATION, Memphis, TN (US)

(72) Inventors: Beichuan Zhang, Tucson, AZ (US); Xin Zhao, Castro Valley, CA (US); Lan Wang, Germantown, TN (US); Yaoqing Liu, Potsdam, NY (US)

(73) Assignees: THE ARIZONA BOARD OF REGENTS ON BEHALF OF THE UNIVERSITY OF ARIZONA, Tucson, AZ (US); THE UNIVERSITY OF MEMPHIS RESEARCH FOUNDATION, Memphis, TN (US)

( * ) Notice: Subject to any disclaimer, the term of this patent is extended or adjusted under 35 U.S.C. 154(b) by 113 days.

(21) Appl. No.: 14/092,717

(22) Filed: Nov. 27, 2013

Related U.S. Application Data

(60) Provisional application No. 61/797,044, filed on Nov. 28, 2012.

(51) Int. Cl.
*H04L 12/751* (2013.01)

(52) U.S. Cl.
CPC .................................. *H04L 45/02* (2013.01)

(58) Field of Classification Search
CPC ..... H04L 45/02; H04L 45/12; H04L 45/122; H04L 45/24; H04L 45/245; H04L 45/36; H04L 45/48; H04L 45/54; H04L 45/72
See application file for complete search history.

(56) References Cited

U.S. PATENT DOCUMENTS

| | | | |
|---|---|---|---|
| 6,888,838 B1 * | 5/2005 | Ji | H04L 45/54 370/392 |
| 8,036,126 B2 | 10/2011 | Shaikh et al. | 370/235 |

(Continued)

OTHER PUBLICATIONS

Draves et al., "Constructing Optimal IP Routing Tables," IEEE, Proceedings of INFOCOM '99, New York, Mar. 1999 (27 pgs).

(Continued)

*Primary Examiner* — Benjamin H Elliott, IV

(57) ABSTRACT

Networking devices and methods for forwarding information base (FIB) aggregation are provided. A networking device includes a processor operable to access entries in a FIB, and aggregate the FIB entries to produce an aggregated FIB with strong forward correctness. In aggregating the FIB entries, the processor is operable to: (a) associate the FIB entries with nodes (n) in a patricia trie; (b) traverse the patricia trie depth-first in post-order and determine for each node a next-hop set, without expanding the trie, by merging what would be the next-hop sets of its imaginary children nodes if there is a complete binary tree; and (c) traverse the patricia trie depth-first in pre-order, select for the root node a next-hop from its next-hop set and include the FIB entry associated with the root node in the aggregated FIB, for each node having a selected next-hop that appears in its child's next-hop set, select that next-hop for the child as its next-hop and exclude the FIB entry associated with the child node from the aggregated FIB, and for each child node which does not have in its next-hop set the selected next-hop of its parent, select a next-hop from its next-hop set and include the FIB entry associated with the child node in the aggregated FIB.

23 Claims, 19 Drawing Sheets

Relationship between FIFA and other router components

(56) References Cited

U.S. PATENT DOCUMENTS

| | | | |
|---|---|---|---|
| 8,149,713 B2 | 4/2012 | Sun et al. | 370/237 |
| 2007/0294502 A1* | 12/2007 | Gunther | G06F 17/2247 711/173 |
| 2013/0034096 A1* | 2/2013 | Hu | H04L 45/54 370/389 |

OTHER PUBLICATIONS

Francois et al., "Achieving sub-second IGP convergence in large IP networks," SIGCOMM, Comput. Commun. Rev., Jul. 2005, vol. 35, No. 3, pp. 35-44 (10 pgs).

"Net::Patricia—Patricia Trie perl module for fast IP address lookups," downloaded from http://search.cpan.org/dist/Net-Patricia/ on Jan. 22, 2014 (6 pgs).

Advanced Network Technology Center and University of Oregon, "University of Oregon Route Views Project," downloaded from http://www.routeviews.org/, on Jan. 22, 2014 (3 pgs).

Liu et al., "Incremental Forwarding Table Aggregation," Proc. IEEE Globecom, 2010 (6 pgs).

Uzmi et al., "SMALTA: Practical and Near-Optimal FIB Aggregation," Proc. CoNEXT, 2011 (12 pgs).

Abraham et al., "A Flexible Quagga-based Virtual Network With FIB Aggregation", undated (8 pgs).

* cited by examiner

Relationship between FIFA and other router components

After pass 1

Initial Tree

After pass 3

After pass 2

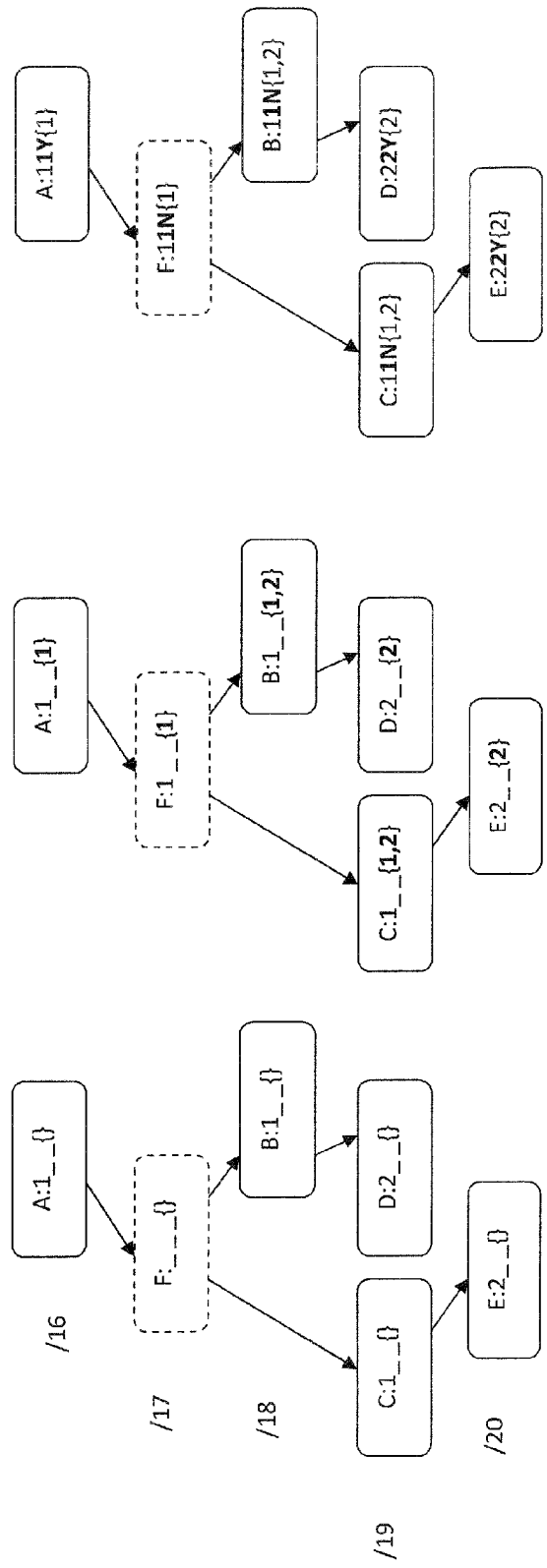

Updating node *H* upon receiving
a new route

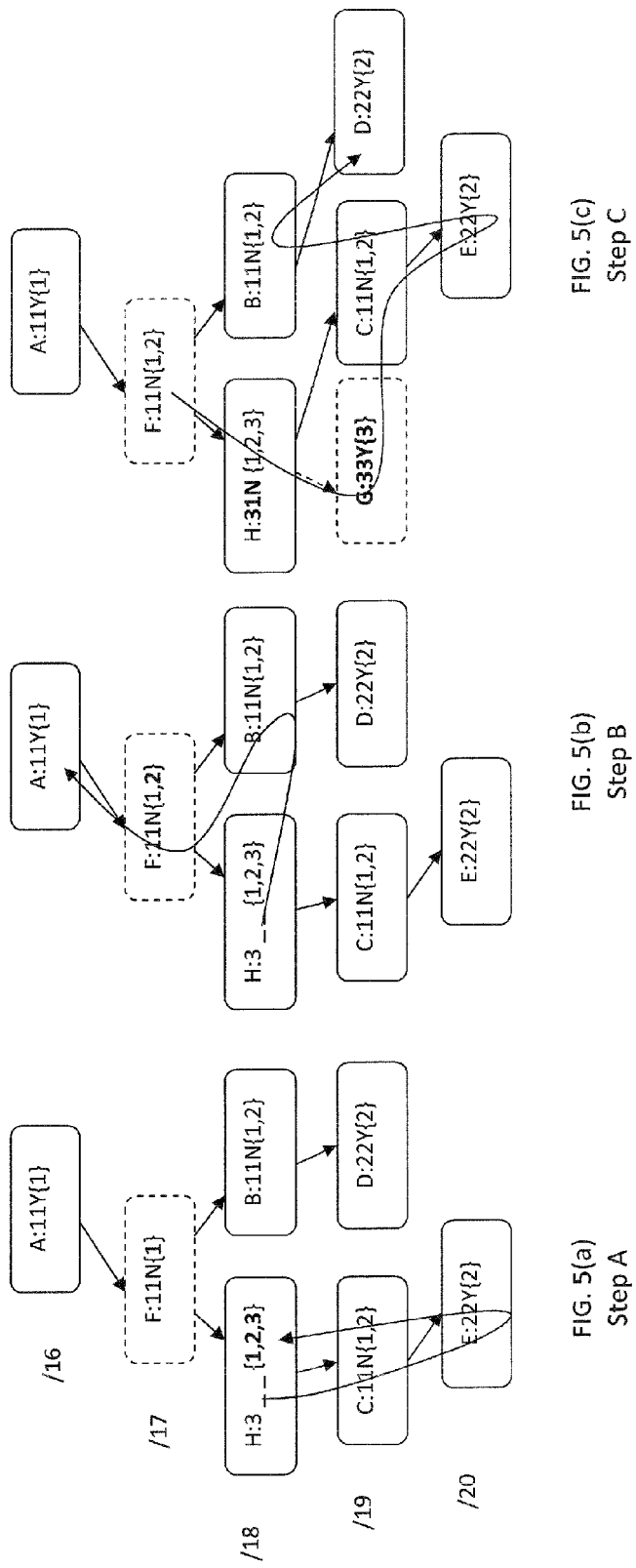

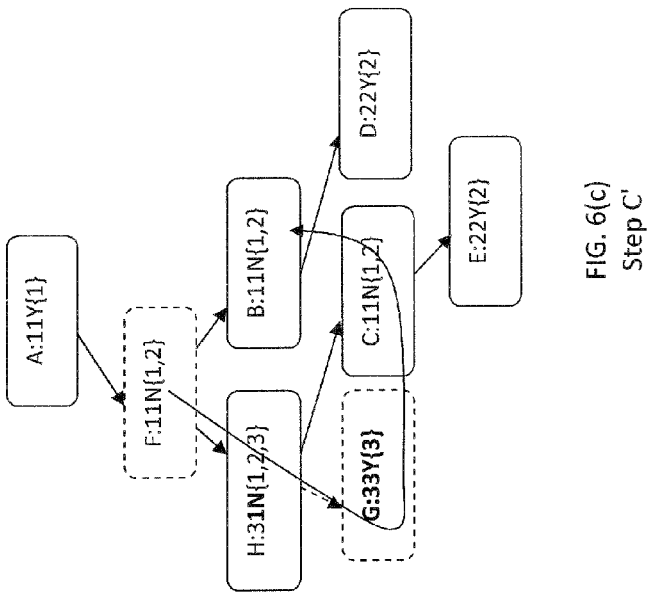
FIG. 6(c) Step C'
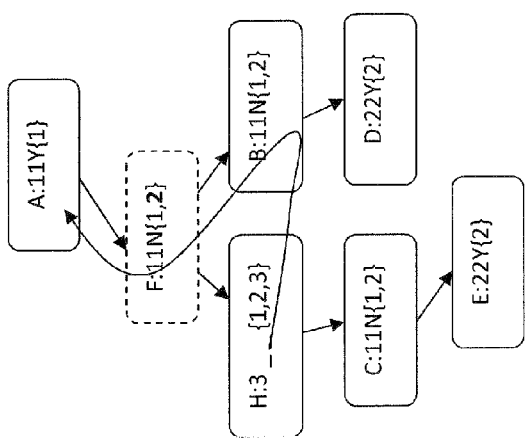
FIG. 6(b) Step B'
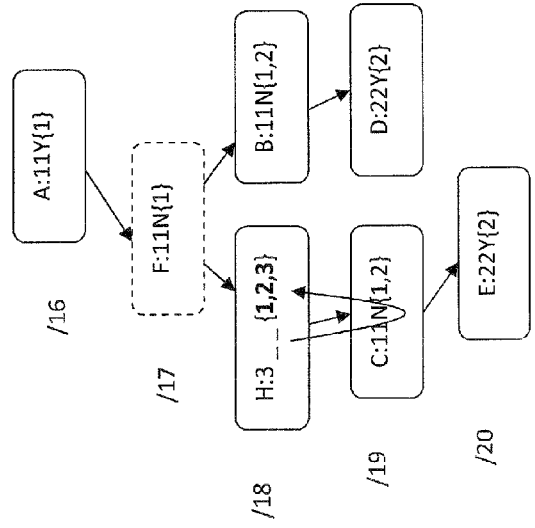
FIG. 6(a) Step A'
Steps in FIFA-S

| Procedure 1 *main (type)* function |
| --- |
| 1:         Build initial FIB trie based on unaggregated FIB |
| 2:         Run improved ORTC on the FIB trie to obtain aggregated FIB |
| 3:         for each update do |
| 4:              if Announcement then |
| 5:                  Lookup the corresponding node and create it if non-existent |
| 6:                  Update the next hop of the current node |
| 7:                  node.type ← REAL |
| 8:              else |
| 9:                  Lookup the corresponding node and return if non-existent |
| 10:                 Remove the next hop of the current node |
| 11:                 node.type ← AUXILIARY |
| 12:             if (type=T) ∨ (type=H) then |
| 13:                 node.optimal← 0 for all ancestors of the current node |
| 14:             switch (type) |
| 15:             case S: |
| 16:                 FIFA_S(node, type) |
| 17:             case T: |
| 18:                 FIFA_T(node) |
| 19:             case H: |
| 20:                 FIFA_H(node, type) |
| 21:             end switch |

FIG. 7(a)

| Procedure 2 *FIFA_S(node,type)* function |
| --- |
| 1:        realAncestor ←nearestRealAncestor(node) |
| 2:        mergeNexthopsBelowNode(node,realAncestor) |
| 3:        highestNode←mergeNexthopsAboveNode(node,type) |
| 4:        infibAncestor←nearestINFIBAncestor(highestNode) |
| 5:        selectNexthop(highestNode,infibAncestor) |

FIG. 7(b)

Procedure 3 *mergeNexthopsBelowNode(node,realAncestor)*

1:         $node.optimal \leftarrow 0$
2:         $l \leftarrow node.l$
3:         $r \leftarrow node.r$
4:         if ($l \neq NULL$) $\wedge$ ($l.type \neq REAL$)then
5:             *mergeNexthopsBelowNode(l,realAncestor)*
6:         if ($r \neq NULL$) $\wedge$ ($r.type \neq REAL$)then
7:             *mergeNexthopsBelowNode(r,realAncestor)*
8:         if ($node.type \neq REAL$)then
9:             $node.originalNexthop \leftarrow realAncestor.originalNexthop$
10:       $node.mergedNexthops \leftarrow merge\,(l,r)$

FIG. 7(c)

Procedure 4 *mergeNexthopsAboveNode(node)*

1:         $parent \leftarrow node.parent$
2:         while *parent* do
3:             if ($type=H$) $\wedge$ ($parent.length \leq CAP$) then
4:                 Return node
5:             $old \leftarrow parent.mergedNexthops$
6:             $new \leftarrow merge(parent.l,parent.r)$
7:             if *old=new* then
8:                 Return node
9:             $node \leftarrow parent$
10:       $node \leftarrow node.parent$
11:       if $type=S$ then
12:            $Node.optimal \leftarrow 0$
13:       Return node

FIG. 7(d)

| | |
|---|---|
| Procedure 5 *selectNexthop(node,ancestor)* | |
| 1: | *oldStatus←node.status* |
| 2: | *oldNexthop←node.selectedNexthop* |
| 3: | if *ancestor.selectedNexthop ∈ node.mergedNexthops* then |
| 4: | *node.selectedNexthop←ancestor.selectedNexthop* |
| 5: | *node.status ← NON_FIB* |
| 6: | else |
| 7: | if *oldNexthop ∈ node.mergedNexthops* then |
| 8: | *node.selectedNexthop←oldNexthop* |
| 9: | else if *node.originalNexthop ⊂ node.mergedNexthops* then |
| 10: | *node.selectedNexthop←node.originalNexthop* |
| 11: | else |
| 12: | *node.selectedNexthop←node.mergedNexthops[0]* |
| 13: | *node.status ← IN_FIB* |
| 14: | *updateFIB(oldStatus,oldNexthop,node)* |
| 15: | if *(oldNexthop=node.selectedNexthop)∧(node.optimal=1)* then |
| 16: | Return |
| 17: | if *node.status = IN_FIB* then |
| 18: | *ancestor←node* |
| 19: | if *(node.l=NULL) ∧node.r=NULL* then |
| 20: | Return |
| 21: | if *node.selectedNexthop ≠node.originalNexthop* then |
| 22: | *generateNewNode(node)* |
| 23: | if *node.l≠NULL* then |
| 24: | *selectNexthop(node.l,ancestor)* |
| 25: | if *node.r≠ NULL* then |
| 26: | *selectNexthop(node.r,ancestor)* |
| 27: | *node.optimal←1* |

FIG. 7(e)

Procedure 6 *updateFIB(oldStatus, oldNexthop, node)*

| | |
|---|---|
| 1: | if *oldStatus ≠ node.status* then |
| 2: |     if *node.status = NON_FIB* then |
| 3: |         Delete the prefix and next hop from FIB |
| 4: |     else |
| 5: |         Add the prefix and next hop to FIB |
| 6: | else if *oldNexthop ≠ node.selectedNexthop* then |
| 7: |     if *node.status = IN_FIB* then |
| 8: |         Update the corresponding next hop to FIB |

FIG. 7(f)

Procedure 7 *FIFA_T (node)* function

| | |
|---|---|
| 1: | if Threshold then |
| 2: |     Do re-aggregation on the FIB trie from the root |
| 3: | else |
| 4: |     *realAncestor ← nearestRealAncestor(node)* |
| 5: |     *mergeNexthopsBelowNode(node, realAncestor)* |
| 6: |     *infibAncestor ← nearestINFIBAncestor(node)* |
| 7: |     *selectNexthop(node, infibAncestor)* |

FIG. 7(g)

Procedure 8 *FIFA_H (node, type)* function

| | |
|---|---|
| 1: | *realAncestor ← nearestRealAncestor(node)* |
| 2: | *mergeNexthopsBelowNode(node, realAncestor)* |
| 3: | *capNode ← mergeNexthopsAboveNode(node, type)* |
| 4: | if ThresholdReached then |
| 5: |     *node ← capNode* |
| 6: | *infibAncestor ← nearestINFIBAncestor(node)* |
| 7: | *selectNexthop(node, infibAncestor)* |

FIG. 7(h)

Step X
in BasicMinTime

Step Y
in BasicMinTime

Steps in BasicMinTime and FIFA-T. Step X and Y are steps for BasicMinTime, while Step X' and Y' are steps for FIFA-T

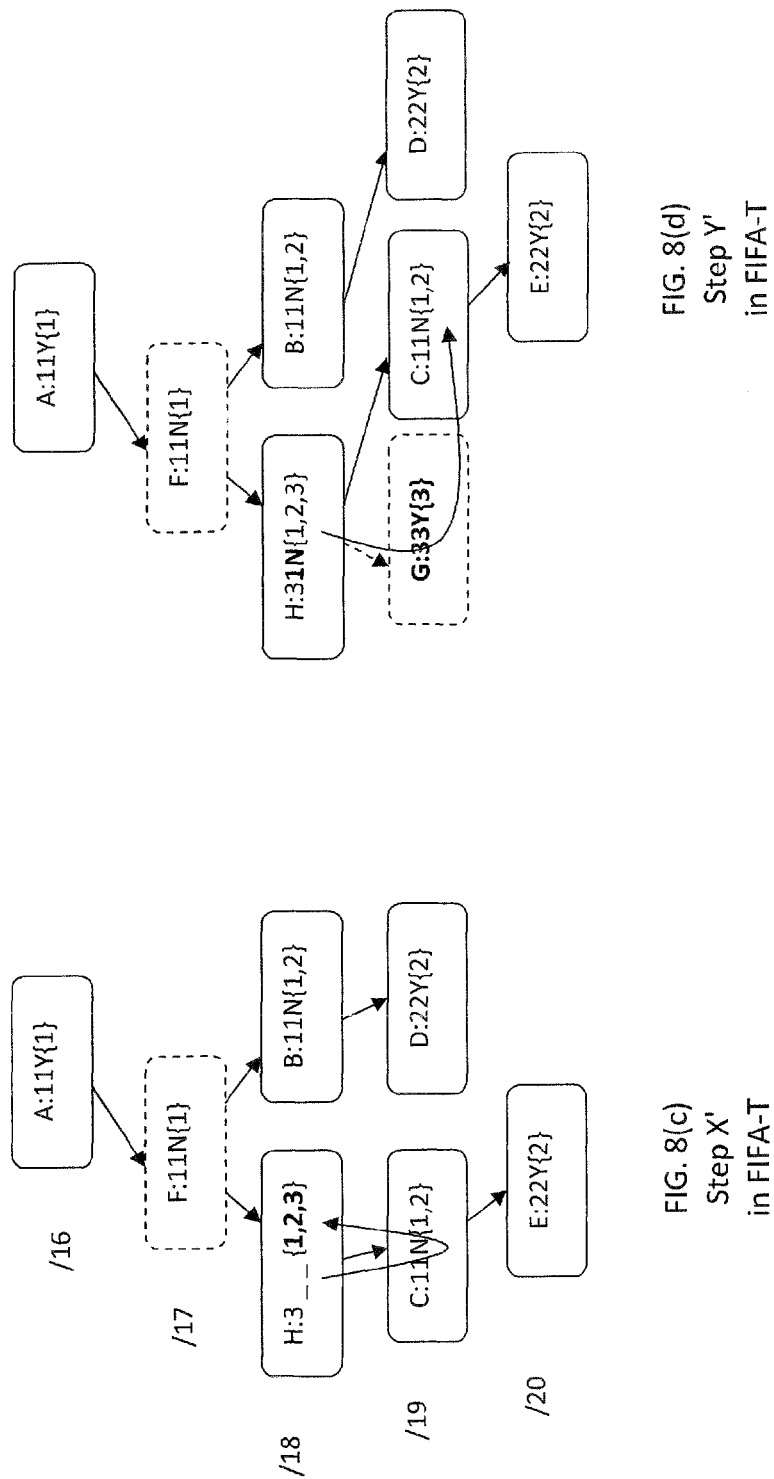
FIG. 8(c) Step X' in FIFA-T
FIG. 8(d) Step Y' in FIFA-T
Steps in BasicMinTime and FIFA-T. Step X and Y are steps for BasicMinTime, while Step X' and Y' are steps for FIFA-T

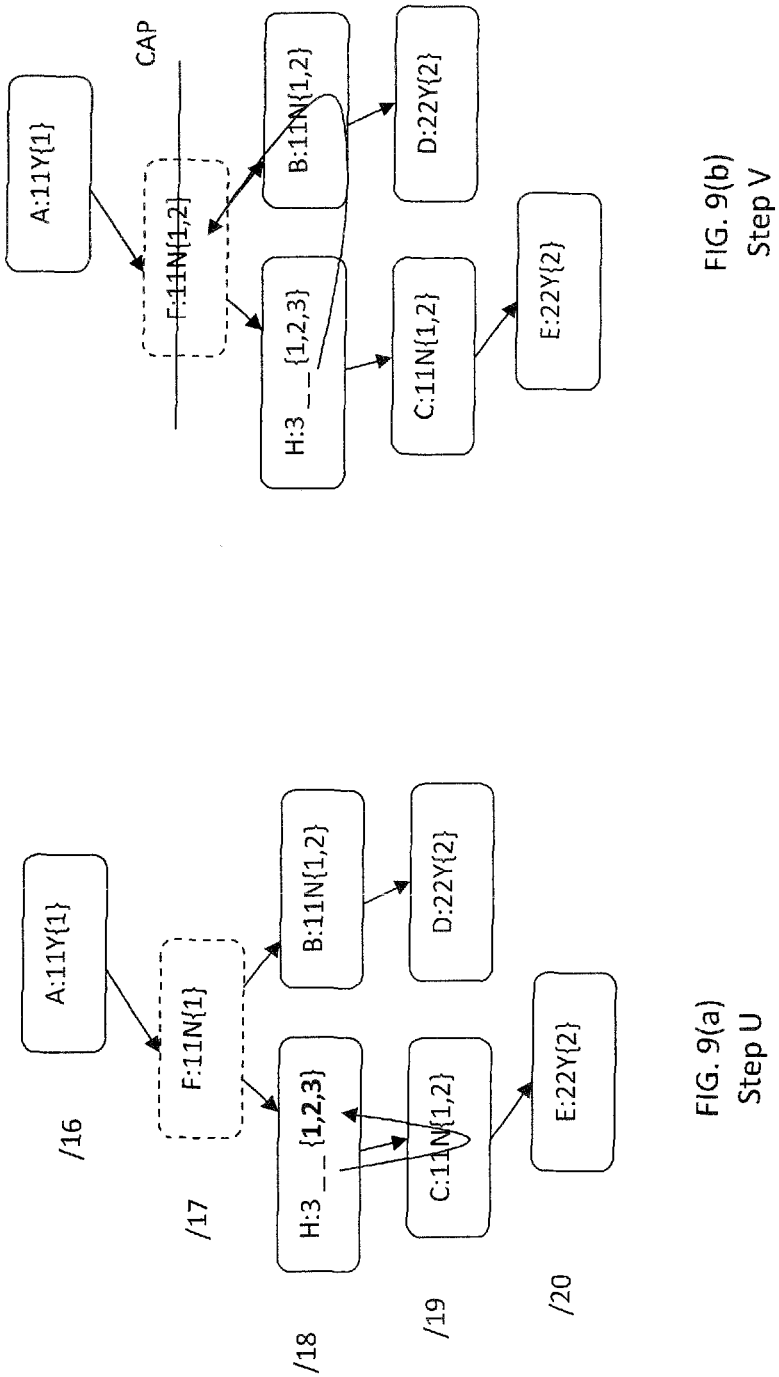

Step W'

Step W

FIFA-H: the first two steps are Step U and V. The third step is Step W before reaching the threshold and Step W' after reaching the threshold.

FIB Size

Time Cost

FIB Changes

FIFA-S vs. BasicOptSize (*Normal* refers to no aggregation)

TABLE III
FIB BURST DISTRIBUTION COMPARISON BETWEEN FIFA-S AND BASICOPTSIZE
| Burst Size | Min | Max | Median | =0 | ≤1 | ≤10 | All |
|---|---|---|---|---|---|---|---|
| BasicOptSize | 0 | 6,226 | 1 | 6,914,934 (12.78%) | 38,185,015 (70.58%) | 52,795,683 (97.59%) | 54,095,965 (100%) |
| FIFA-S | 0 | 568 | 1 | 6,961,449 (12.87%) | 38,645,578 (71.43%) | 53,318,607 (98.56%) | 54,095,965 (100%) |
FIG. 11
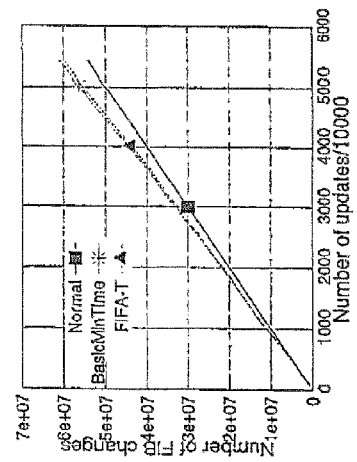
FIG. 12(c)
FIB Changes
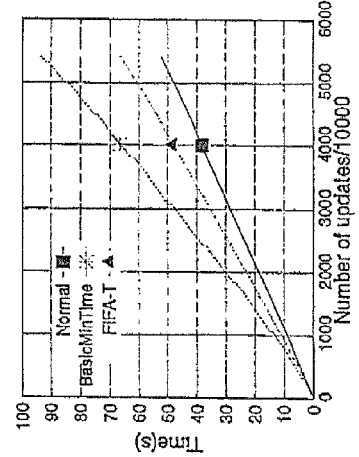
FIG. 12(b)
Time Cost
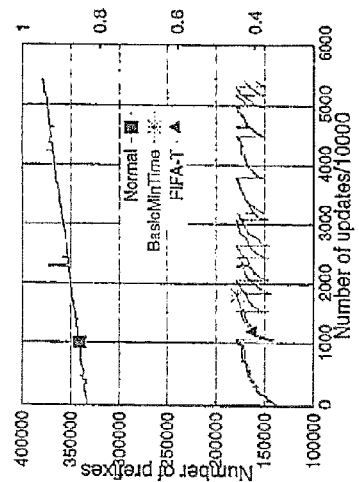
FIG. 12(a)
FIB Size
FIFA-T vs. BasicMinTime (*Normal* refers to no aggregation)

TABLE IV

FIB BURST DISTRIBUTION COMPARISON BETWEEN FIFA-T AND BASICMINTIME

| Burst Size | Min | Max | Median | =0 | ≤1 | ≤10 | All |
|---|---|---|---|---|---|---|---|
| BasicMinTime | 0 | 149,815 | 1 | 6,080,983 (11.24%) | 49,611,562 (91.71%) | 53,913,320 (99.66%) | 54,095,973 (100%) |
| FIFA-T | 0 | 69,526 | 1 | 6,150,664 (11.36%) | 49,704,177 (91.88%) | 53,919,736 (99.67%) | 54,095,965 (100%) |

FIG. 13

TABLE V

FIB BURST DISTRIBUTION COMPARISON AMONG THREE FIFA SCHEMES AND SMALTA

| Burst Size | Min | Max | Median | =0 | ≤1 | ≤10 | All |
|---|---|---|---|---|---|---|---|
| FIFA-S | 0 | 568 | 1 | 6,961,449 (12.87%) | 38,645,578 (71.43%) | 53,318,607 (98.56%) | 54,095,965 (100%) |
| FIFA-T | 0 | 69,526 | 1 | 6,150,664 (11.36%) | 49,704,177 (91.88%) | 53,919,736 (99.67%) | 54,095,965 (100%) |
| FIFA-H | 0 | 1,182 | 1 | 6,232,328 (11.52%) | 48,997,278 (90.57%) | 53,784,161 (99.42%) | 54,095,965 (100%) |
| SMALTA | 0 | 72,856 | 1 | 4,456,410 (8.23%) | 48,297,973 (89.28%) | 53,873,603 (99.58%) | 54,095,976 (100%) |

FIG. 14

FIB Size

Time Cost

FIB Changes

FIFA Algorithms vs. SMALTA (*Normal* refers to no aggregation)

DEVICES AND METHODS FOR FORWARDING INFORMATION BASE AGGREGATION

CROSS REFERENCE TO RELATED APPLICATION

This application claims priority from U.S. Provisional Application Ser. No. 61/797,044, filed Nov. 28, 2012, the contents of which are incorporated herein in their entirety.

STATEMENT OF GOVERNMENT INTEREST

This invention was made with Government support under CNS0721863 awarded by NSF. The Government has certain rights in the invention.

FIELD OF THE DISCLOSURE

The present disclosure is generally related to networking devices and routing tables, and more particularly is related to devices and methods for producing an aggregated forwarding information base (FIB), and for updating an aggregated FIB.

BACKGROUND OF THE DISCLOSURE

Routers are networking or communications devices for routing and forwarding data packets over a network. Routers typically exchange information using routing protocols to discover the topology of the network and to determine paths for routing packets through the network. The exchanged information is stored in a Routing Information Base (RIB), which stores all IP routing information, and is responsible for next-hop selection from multiple available routes received from different peers. The router processes information in the RIB to determine how to forward packets from the router, with this information stored in a Forwarding Information Base (FIB). The FIB typically contains a subset of the RIB information, i.e., the address prefixes and their select next hops, for fast lookup during data forwarding. In the core of the network, it is possible for the FIB to contain hundreds of thousands of entries (e.g., one for each route in the FIB). When a router uses a distributed architecture, the same FIB is typically stored on each line card.

The global routing table size has been increasing faster than ever in a super-linear trend, mostly due to the practice of multihoming and traffic engineering. This has caused serious concerns from both academia and industry. Once the FIB becomes so large that it can no longer fit in the fast memory of routers' line cards, ISPs have to upgrade their line cards, eventually making Internet services more expensive. While solutions have been proposed to solve the routing table scalability problem in the long run by changing the routing architecture, Internet service providers (ISPs) need practical solutions soon, and FIB aggregation may be the most practical solution.

FIB aggregation reduces FIB size by combining entries whose prefixes are numerically aggregatable and whose next hops are the same. It is a software solution that can be applied to a single router without upgrading the hardware, changing the control plane, or affecting packets' forwarding paths. Thus it can be deployed incrementally and selectively in a network at operators' discretion. One of the fundamental tradeoffs in FIB aggregation is between aggregated table size and computation overhead. Spending too much CPU cycles in aggregating the table will delay the downloading of the table into the line cards, which may lead to packet loss or incorrect forwarding.

One of the most challenging problems in FIB aggregation is to quickly apply updates to the already aggregated table and still maintain good compression ratio. When a router receives a routing update, it has very limited amount of time to process the update and install the new FIB. When the FIB is already aggregated, one routing table change may lead to updating multiple FIB entries, because it may change the aggregatability of those entries. In some cases, there can be thousands or even tens of thousands FIB entries to be updated, even if there is only a single routing table change.

SUMMARY OF THE DISCLOSURE

As discussed above, fast growth of global routing table size has been causing concerns that the Forwarding Information Base (FIB) will not be able to fit in existing routers' expensive line-card memory, and thus upgrades will lead to higher cost for network operators and customers. FIB Aggregation, a technique that merges multiple FIB entries into one, is probably the most practical solutions since it is a software solution local to a router, and does not require any changes to routing protocols or network operations. While previous work on FIB aggregation mostly focuses on reducing table size, embodiments provided by the present disclosure can update compressed FIBs quickly and incrementally. Quick update is critical to routers because they have very limited time to process routing updates without impacting packet delivery performance.

To this end, the present disclosure provides, among others, three algorithms, generally referred to herein as: "FIFA-S" for smallest table size, "FIFA-T" for shortest running time, and "FIFA-H" for both small tables and short running time. They take advantage of some intrinsic properties of an aggregated FIB trie to speed up the incremental update process. Among them, FIFA-S and FIFA-H do not need to run full re-aggregations, and FIFA-T performs fast re-aggregation on existing aggregated trie. Moreover, they use a prioritized set of next-hop selection rules to improve the stability of the aggregated FIB, thus reducing the number of FIB changes per routing table change. Our evaluation using BGP data shows that they provide significant advantages over the state-of-art algorithms in terms of processing time of a stream of updates, speed of re-aggregation, and size of FIB bursts triggered by individual updates. These algorithms significantly improve over existing work in terms of reducing routers' computation overhead and limiting impact on the forwarding plane while maintaining good compression ratio.

Embodiments of the present disclosure provide networking devices and methods for forwarding information base (FIB) aggregation. Briefly described, in architecture, one embodiment of a networking device, among others, can be implemented as follows. A networking device includes a processor. The processor is operable to access entries in a forwarding information base (FIB), each of the FIB entries comprising an address prefix and an associated selected next-hop, and aggregate the FIB entries to produce an aggregated FIB with strong forward correctness. In aggregating the FIB entries, the processor is further operable to: (a) associate the FIB entries with nodes (n) in a patricia trie; (b) traverse the patricia trie depth-first in post-order and determine for each node a next-hop set, without expanding the trie, by merging what would be the next-hop sets of its imaginary children nodes if there is a complete binary tree;

and (c) traverse the patricia trie depth-first in pre-order, select for the root node a next-hop from its next-hop set and include the FIB entry associated with the root node in the aggregated FIB, for each node having a selected next-hop that appears in its child's next-hop set, select that next-hop for the child as its next-hop and exclude the FIB entry associated with the child node from the aggregated FIB, for each child node which does not have in its next-hop set the selected next-hop of its parent, select a next-hop from its next-hop set and include the FIB entry associated with the child node in the aggregated FIB.

In another embodiment, the present disclosure provides a method for forwarding information base (FIB) aggregation that includes the steps of: accessing, by a processor of a networking device, entries in a forwarding information base (FIB), each of the FIB entries comprising an address prefix and an associated selected next-hop; and aggregating the FIB entries to produce an aggregated FIB with strong forward correctness, by: (a) associating the FIB entries with nodes (n) in a patricia trie; (b) traversing the patricia trie depth-first in post-order and determining for each node a next-hop set, without expanding the trie, by merging what would be the next-hop sets of its imaginary children nodes if there is a complete binary tree; and (c) traversing the patricia trie depth-first in pre-order, selecting for the root node a next-hop from its next-hop set and including the FIB entry associated with the root node in the aggregated FIB, for each node having a selected next-hop that appears in its child's next-hop set, selecting that next-hop for the child as its next-hop and excluding the FIB entry associated with the child node from the aggregated FIB, for each child node which does not have in its next-hop set the selected next-hop of its parent, selecting a next-hop from its next-hop set and including the FIB entry associated with the child node in the aggregated FIB.

In yet another embodiment, the present disclosure provides a non-transitory computer readable medium containing instructions for providing a method for forwarding information base (FIB) aggregation, enabled at least in part on a processor of a computerized device, which when executed by the processor, performing the steps of: accessing entries in a forwarding information base (FIB), each of said FIB entries comprising an address prefix and an associated selected next-hop; and aggregating the FIB entries to produce an aggregated FIB with strong forward correctness, by: (a) associating the FIB entries with nodes (n) in a patricia trie; (b) traversing the patricia trie depth-first in post-order and determining for each node a next-hop set, without expanding the trie, by merging what would be the next-hop sets of its imaginary children nodes if there is a complete binary tree; and (c) traversing the patricia trie depth-first in pre-order, selecting for the root node a next-hop from its next-hop set and including the FIB entry associated with the root node in the aggregated FIB, for each node having a selected next-hop that appears in its child's next-hop set, selecting that next-hop for the child as its next-hop and excluding the FIB entry associated with the child node from the aggregated FIB, for each child node which does not have in its next-hop set the selected next-hop of its parent, selecting a next-hop from its next-hop set and including the FIB entry associated with the child node in the aggregated FIB.

Accordingly, embodiments provided by this disclosure may advantageously result in reducing FIB aggregation's overhead in the following aspects: (1) reducing the overall time of processing a stream of updates; (2) speeding up the process to re-aggregate an entire FIB, if a scheme requires such re-aggregations; and (3) reducing the average and maximum number of FIB changes caused by any individual routing table change, so as to reduce the time it takes to push those changes to the line card.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3a-3c are Patricia Trie illustrating a method for forwarding information base (FIB) aggregation, in accordance with embodiments of the present disclosure.

FIGS. 5a-5c illustrate the steps in updating a FIB trie using the BasicOptSize algorithm.

FIGS. 6a-6c illustrate steps in updating a FIB trie using FIFA-S, in accordance with embodiments of the present disclosure.

FIGS. 7a-h are pseudo-code representations of processes for aggregating and/or updating a FIB, in accordance with embodiments of the present disclosure.

FIGS. 8a-8d illustrate the differences in updating an aggregated FIB between BasicMinTime and FIFA-T, in accordance with embodiments of the present disclosure.

FIGS. 9a-9d illustrate steps in updating a FIB trie using FIFA-H, in accordance with embodiments of the present disclosure.

FIG. 11 is a table illustrating a FIB burst distribution comparison between FIFA-S and BasicOptSize.

FIGS. 12a-12c are a set of plots comparing FIFA-T with the BasicMinTime algorithm, in terms of FIB size, time cost and FIB changes.

FIG. 13 is a table illustrating a FIB burst distribution comparison between FIFA-T and BasicMinTime.

FIG. 14 is a table illustrating a FIB burst distribution comparison among the three FIFA schemes and SMALTA.

DETAILED DESCRIPTION

Embodiments of the disclosure may take the form of computer-executable instructions, including algorithms executed by a processor or a programmable computer. However, the disclosure can be practiced with other computer system configurations as well. Certain aspects of the disclosure can be embodied in a special-purpose computer or data processor that is specifically programmed, configured or constructed to perform one or more of the algorithms described below.

Moreover, aspects of the disclosure may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Figure 1:
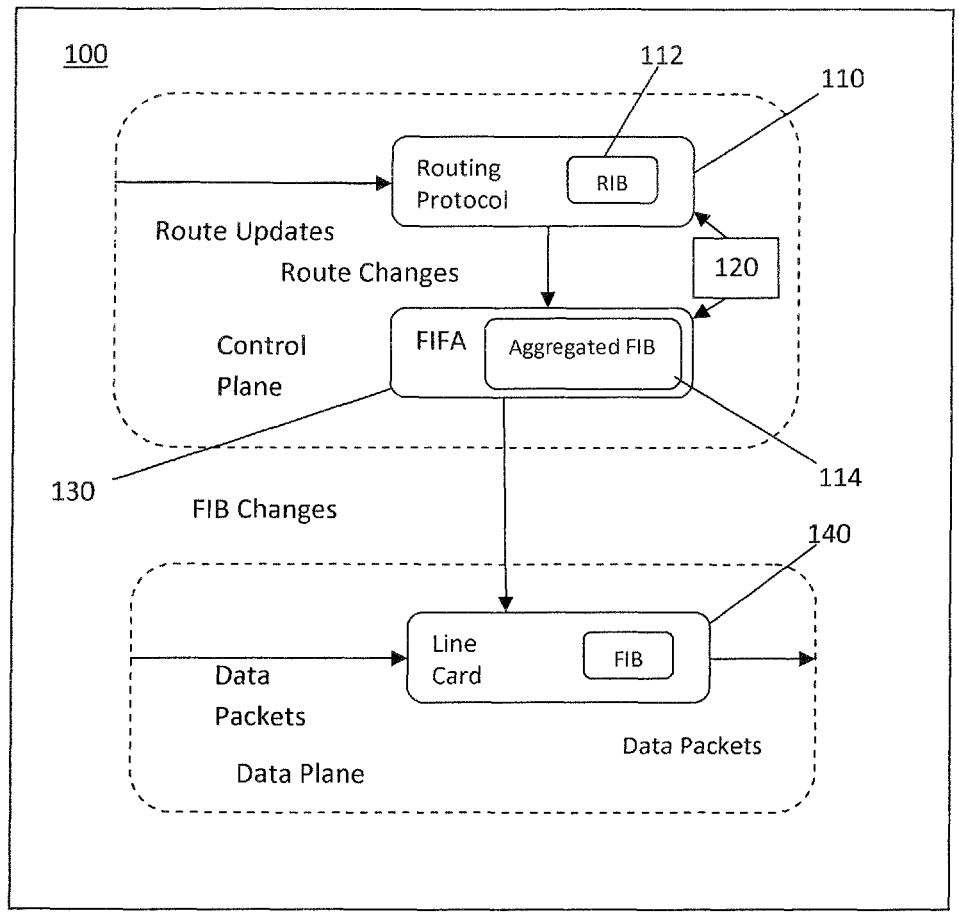
FIG. 1 is a schematic illustration of a networking device for performing FIB aggregation, in accordance with a first exemplary embodiment of the present disclosure.

FIG. 1 is a schematic illustration of a networking device 100 (e.g., a router) for performing FIB aggregation, in accordance with a first exemplary embodiment of the present disclosure. The device 100 may include a routing protocol 110, a processor 120 and a Fast Incremental FIB Aggregation module 130 (which may be or include computer-readable storage having instructions for performing FIB aggregation and/or updating, as described herein) in the control plane, and further may include a line card 140 in the data plane. One or more communications mechanisms, as known in the relevant field (e.g., switch fabric, bus, backplane, etc.), may be used to provide communication among the control plane and data plane.

The device 100 further includes computer-readable storage 112 for the Routing Information Base (RIB), as well as computer-readable storage 114 for the aggregated Forwarding Information Base (FIB). The networking device 100 communicates with other routers (e.g., by receiving routing updates, as shown), via the routing protocol 110, to generate the RIB for identifying topology information of, including routes within, a network attached to the device 100. Based on the RIB, the processor 120 generates a FIB identifying forwarding information for a plurality of routes, and the FIFA module 130 is utilized to produce an aggregated FIB 114, which may be communicated to, and installed in, one or more line cards 140.

The one or more line cards 140 may include storage for the aggregated FIB, and one or more processors for determining how to forward a packet based on the aggregated FIB stored in the line cards 140.

When the networking device 100 starts up, the processor 120 accesses the FIFA module 130 to build the initial aggregated FIB, employing any of the FIB aggregation methods (e.g., the improved ORTC algorithm) described in further detail below. The aggregated FIB may be stored in storage 114 and installed in the one or more line cards 140. When a new routing update arrives, the routing protocol 110 will update the RIB 112 and the FIFA module 130 is again accessed to apply each resulting route change to the aggregated FIB (e.g., utilizing any of the FIFA methods described in further detail below), which may generate one or more changes to the (previously aggregated) FIB in the one or more line cards 140. The FIFA module 130 and/or processor 120 then installs these FIB changes in the one or more line cards 140.

FIB Aggregation (Generally):

As noted in the "Background" section, a Routing Information Base (RIB) stores all IP routing information, and is responsible for next-hop selection from multiple available routes received from different peers. A subset of the RIB information, i.e., the address prefixes and their selected next-hops, are installed in the Forwarding Information Base (FIB) for fast lookup during data forwarding.

Definition 1. Given an IP address d and a FIB F, let LPM(F,d) denote d's Longest Prefix Match, and nexthop(F, p) denote the next-hops for prefix p. We define nexthop(F, d)=nexthop(F, LPM(F,d)). It is possible that d does not have any match in the FIB, i.e., LPM(F,d)=NULL, and packets destined to d will be dropped.

As an example, Table I(a) shows a FIB F with five entries. For address 141.225.48.7, LPM(F, 141.225.48.7)= 141.225.48.0/20, and nexthop(F, 141.225.48.7)=nexthop(F, 141.225.48.0/20)={2}.

TABLE I

FIB ENTRIES BEFORE AND AFTER AGGREGATION

| Label | Prefix | Next Hop |
|---|---|---|
| (a) Original FIB Entries | | |
| A | 141.225.0.0/16 | 1 |
| B | 141.225.64.0/18 | 1 |
| C | 141.225.32.0/19 | 1 |
| D | 141.225.96.0/19 | 2 |
| E | 141.225.48.0/20 | 2 |
| (b) Aggregated FIB Entries | | |
| A | 141.225.0.0/16 | 1 |
| D | 141.225.96.0/19 | 2 |
| E | 141.225.48.0/20 | 2 |

In embodiments provided by the present disclosure, FIB aggregation is to aggregate a FIB into one with fewer number of entries (i.e. an aggregated FIB) while ensuring "forwarding correctness," i.e., the aggregated FIB should not change the next-hops that packets take to reach their destinations. All the FIB aggregation algorithms provided by this disclosure satisfy strong forwarding correctness as defined below:

Definition 2. Given a FIB F, another FIB F' satisfies Strong Forwarding Correctness with respect to F if and only if the following conditions hold: (1) any non-routable address in F will remain non-routable in F', i.e., if LPM (F,d)=NULL, then LPM(F',d)=NULL; (2) the next-hop of any routable address in F will remain the same in F', i.e., if LPM(F,d)≠NULL, nexthop(F',d)=nexthop(F,d). If only the second condition holds, we say that F' satisfies Weak Forwarding Correctness with respect to F (this means a non-routable address in F can become routable in F).

Even if two algorithms satisfy the same type of forwarding correctness, they may reduce a FIB into different sizes depending on which cases they handle. In the simplest case, when several consecutive prefixes share a common next-hop, they can be combined into a shorter prefix with the same next-hop. Another simple case is when a prefix and its nearest ancestor prefix share the same next-hop, this prefix can be removed from the FIB. In both cases, the longest prefix match will return the shorter prefix, but the returned next-hop will still be correct. The second case is illustrated in Table I, where the entries B and C can be removed from the original FIB—they share the same next hop as the entry A, and A's prefix (141.225.0.0/16) is their nearest ancestor prefix. There are more complex cases where aggregation can happen.

Optimal Routing Table Constructor (ORTC):

In some embodiments, processes for FIB aggregation are performed that are based on a modified version of the Optimal Routing Table Constructor (ORTC), a one-time aggregation algorithm that minimizes the FIB size with strong forwarding correctness. See R. Draves et al. "Constructing Optimal IP Routing Tables," in Proc. IEEE INFOCOM, 1999, the entirety of which is incorporated herein by reference. The basic ORTC algorithm uses a binary tree to store FIB entries and traverses the tree three times to produce the aggregated FIB. As will be described in further detail below, with respect to embodiments provided by this disclosure, ORTC can be implemented using a Patricia trie with two tree traversals. However, for ease of illustration, the basic ORTC algorithm will first be explained using a binary tree and three passes. The FIB in Table I(a) is issued for the example.

Figure 2B:
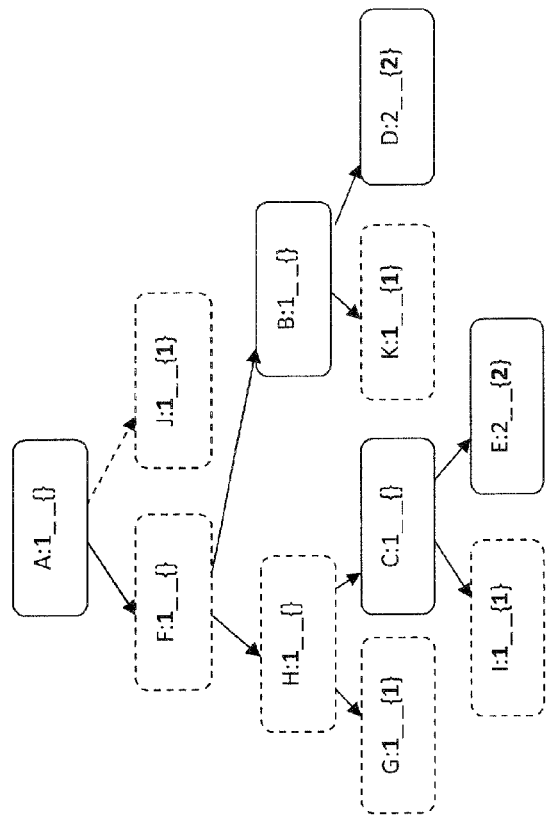
FIGS. 2a-2d illustrate the binary trees after each stage of the ORTC aggregation algorithm, in accordance with aspects of the present disclosure.
Figure 2A:
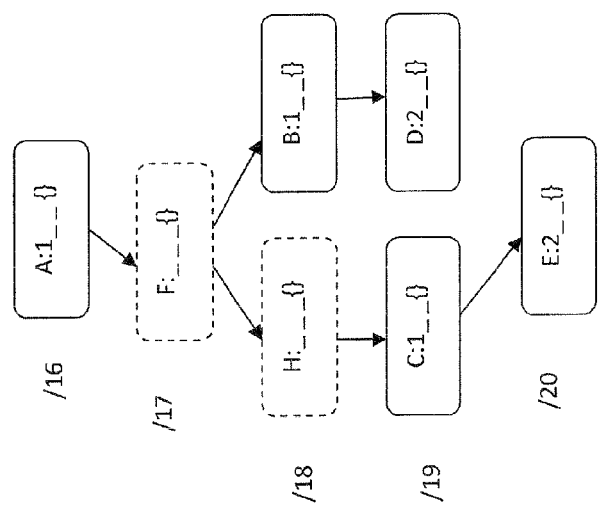

FIG. 2(a) shows the initial binary tree with seven nodes. Five of the nodes, A, B, C, D, and E, correspond to the FIB entries in Table I(a). We call them "real" nodes and the other two nodes, F and H, "auxiliary" nodes. There are four fields for each node from left to right: original next hop, selected next hop, FIB status (Y: IN_FIB, N: NON_FIB), and nexthop set. A bold font denotes a field updated in the current step. A solid rectangle denotes a real node from the unaggregated FIB. A dashed rectangle denotes an auxiliary node generated either as a glue node or for optimization purposes.

Figures 2C, 2D:
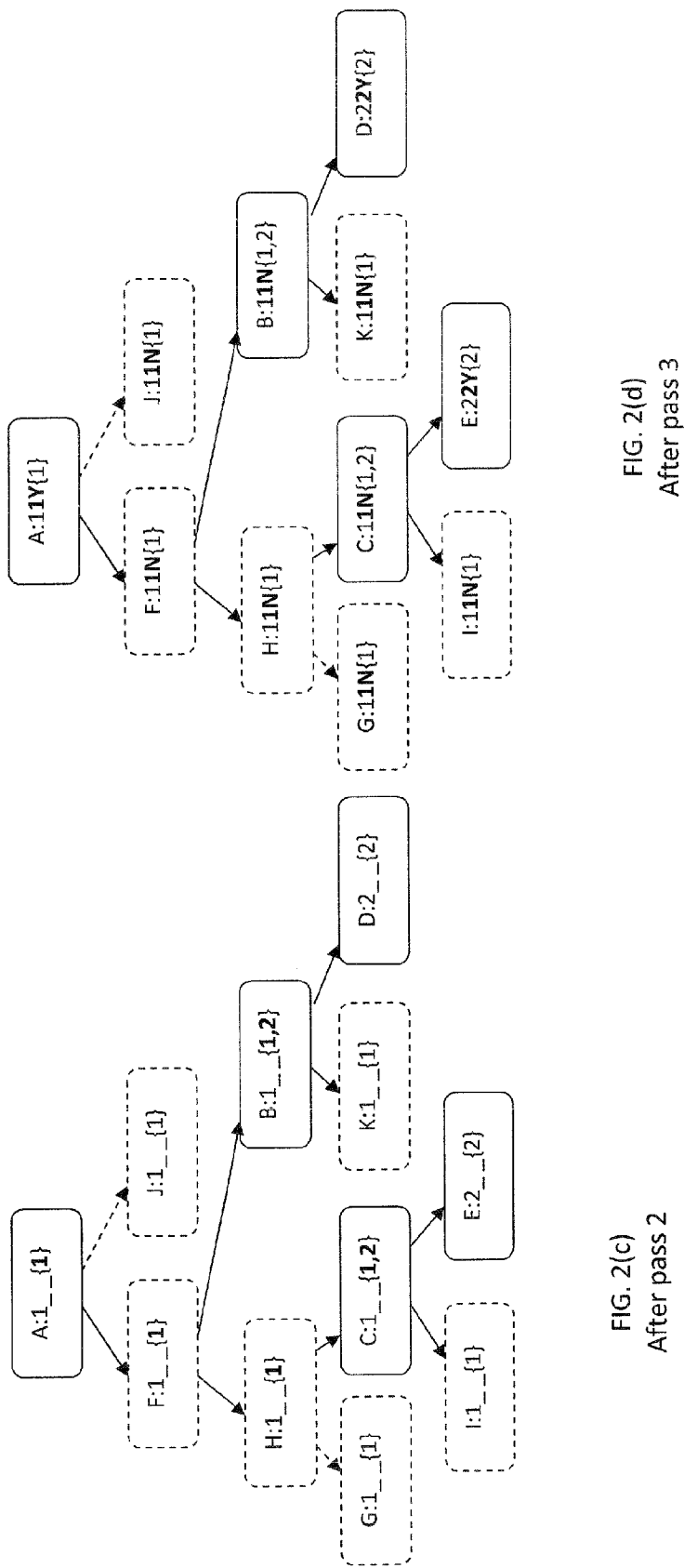

The first pass is a depth-first traversal in pre-order to normalize the tree, so that all the nodes have zero or two children. The expanded nodes have the same next-hops as their nearest ancestor that are real nodes. FIG. 2(b) depicts the process for pass 1. Nodes G, I, J and K are the expanded leaf nodes, and they have the same next-hops as their nearest real ancestors A, C, A, and B, respectively. The second pass is a depth-first traversal in post-order to merge next-hops, in which two children merge their next-hop sets to form their parent's next-hop set. If the two children have one or more common next-hops, the merging uses an intersection operation, otherwise, it uses a union operation. FIG. 2(c) depicts the merging process. For example, E and I have no common next-hops, so their parent C's next-hop set is {1,2}, the union of {1} and {2}. Another example is H, whose next-hop set {1} is the intersection of C's next-hop set {1,2} and G's next-hop set {1}.

The third pass is a depth-first traversal in pre-order to select each node's next-hop and form the aggregated FIB. More specifically, the root can have a next-hop randomly selected from its next-hop set (the original next-hop is preferred for stability). From then on, if a node's selected next-hop h appears in its child's next-hop set, then the child should have h as its selected next-hop, and the child will not be loaded into the FIB. Otherwise, the child will have a next-hop randomly selected from its next-hop set, and the child will be loaded into the FIB.

FIG. 2(d) shows the results after pass three. Root A has 1 as its selected next-hop. Since its children F and H have 1 in their next-hop set, they also have 1 as their selected next-hops and, as such, they will not appear in the aggregated FIB. Similar logic applies for B. On the other hand, D's selected next-hop (1) is different from that of its parent B (2), so it must be put into the aggregated FIB. Table I(b) shows the three final prefixes (A, D, and E) and their next-hops after three passes.

Fast Incremental FIB Aggregation (FIFA):

In embodiments provided by this disclosure, FIB aggregation algorithms are employed that are practical to use in a real production network, and provide several significant advantages. First, they reduce the FIB size sufficiently to postpone the upgrading of FIB memory in line cards by several years. Second, they handle route changes fast as a router may need to handle a large number of routing changes during routing convergence. Third, they do not incur a large number of FIB changes per routing update. According to Francois et al. ("Achieving sub-second IGP convergence in large IP networks," SIGCOMM Comput. Commun. Rev., vol. 35, no. 3, pp. 35-44, July 2005), the time required to update a FIB entry in a real router is about 100 μs. Since one route change may result in multiple FIB changes on an aggregated FIB, it is desirable to minimize such FIB changes. Finally, the FIB aggregation techniques provided herein maintain strong forwarding correctness to avoid potential looping problems associated with weak forwarding correctness.

Embodiments of devices and methods provided herein implement fast incremental FIB aggregation (FIFA), which may include any of three algorithms (referred to herein as "FIFA-S," "FIFA-T" and "FIFA-H"), and ISPs can choose to implement one or more of the devices or methods based on their concerns. FIFA-S keeps the FIB size smallest among the three, with very light FIB bursts and no FIB re-aggregation. FIFA-T is the fastest among the three, with relatively small number of FIB changes and fast re-aggregation. FIFA-H is a hybrid approach combining the advantages of both FIFA-S and FIFA-T. It has medium time cost compared to the other two schemes, and much lighter FIB burst than FIFA-T. Moreover, it does not perform any re-aggregations.

Next, FIB aggregation utilizing an improved version of ORTC and the three FIFA algorithms are described.

FIB Aggregation (Improving ORTC Efficiency):

In embodiments provided herein, FIB aggregation is accomplished based on modifications (and improvements) to the ORTC algorithm. Namely, devices and methods provided by this disclosure perform FIB aggregation while avoiding two inefficiencies in the ORTC algorithm: (1) the basic ORTC algorithm traverses the FIB tree three times, so it can be quite slow for a large FIB; and (2) ORTC uses a binary tree structure that could consume more memory than necessary when there are large gaps between address prefixes and the large number of tree nodes means slower tree traversals.

In embodiments provided by the present disclosure, FIB aggregation is accomplished with ORTC using two passes on a Patricia Trie. See "Net-Patricia Pert Module." [Online]. Available: http://search.cpan.org/dist/Net-Patricia/, the entire contents of which is incorporated herein by reference. A Patricia Trie is a space-optimized tree in which a child prefix can be longer than its parent prefix by more than one, thus eliminating unnecessary internal nodes. For example, FIG. 3(a) shows the Patricia Trie representation of the FIB entries in Table I(a)—node C has a prefix length 19 while its parent F has a prefix length of 17. Both implementations were tested using RouteView's data (Advanced Network Technology Center and University of Oregon, "The RouteViews project." [Online}. Available: http://www.routeviews.org/). For a routing table of 332,588 entries, FIB aggregation utilizing the Patricia Trie-based ORTC algorithm is 2.5 times faster and uses only 44% of the memory consumed by the original ORTC implementation. In order to distinguish the Patricia trie-based ORTC algorithm from the basic ORTC, "Round One" (FIG. 3(b)) and "Round Two" (FIG. 3(c)) are used to represent its new passes. Round One is a depth-first traversal in post-order to merge next hops (as in pass two) without normalizing the tree (otherwise we get a complete binary tree). Round Two is a depth-first traversal in pre-order to select next-hops (as in pass three) and it adds new nodes to the tree whenever necessary to maintain forwarding correctness.

For Round One, in order to merge the next-hops correctly without expanding the trie, we compute a node's next-hop set by merging what would be the next-hop sets of its imaginary children if there is a complete binary tree. Let $S(n)$ be the next-hop set of node n, $S_l(n)$ and $S_r(n)$ be the next-hop set of n's imaginary left and right child, respectively. Then $S(n)$=merge($S_l(n)$, $S_r(n)$). In FIG. 3(b), S(n) is the last value associated with each node.

In some embodiments, $S_l(n)$ (as well as $S_r(n)$) are determined, as follows. Let H(n) be the original next-hop of n, and d be the difference between the prefix length of a node and that of its actual left child.

There are four possible cases: no left child, d=1, d=2, and d>2. In each case, the determination is performed based on the rules (1 through 4) provided below (all the examples refer to the FIB Patricia Trie shown in FIG. 3(b)). The rules can be proven by expanding the part of the trie that includes the parent and the child into a complete binary structure and applying the merging rules to it.
1) No left child: $S_l$ is derived from the original next-hop of the parent node, since the child was to be created from tree normalization. For example, C has no left child, so $S_l(C)$={H(C)}={1}.
2) d=1: $S_l$ is the next-hop set of the actual left child. For example, d=1 for A and F, so $S_l(A)$=S(F)={1}.
3) d=2: $S_l$ is the merged next-hops of the parent's original next-hop and the actual left child's next-hop set. For example, d=2 between F and C, so $S_l(F)$={H(F)}∩S(C)={1}∩{1, 2}={1}.
4) d>2: $S_l$ is a set containing only the original next-hop of the parent node.

$S_r(n)$ is then obtained using the same procedure, and S(n) is determined by merging $S_l(n)$ and $S_r(n)$. For example, since d=1 between F and B, $S_r(F)$=S(B)={1,2}. Therefore, $S(F)$=$S_l(F)$∩$S_r(F)$={1}∩{1, 2}={1}.

Round Two proceeds through similar steps as pass three (of ORTC) to select the next-hop of each node. In addition, it creates a new node when H(n)≠H'(n), where H(n) and H'(n) are the original and selected next hop of node n, and one of the following two conditions is satisfied:
1) d≥2: if n has a left (right) child with prefix length greater than n's length by at least 2, then a left (right) child under n is created.
2) One child is missing: if n has no left (or right) child, then a left (or right) child under n is created.

Otherwise, there is no need to create new nodes. After the two rounds are performed, using the FIB aggregation techniques provided herein, we obtain the same set of aggregated FIB entries as the original ORTC does, but with much fewer nodes in general. For example, in FIG. 3(c), no new node needed to be created, because H(n)=H'(n) for all the nodes, and only six nodes are created compared to 11 nodes in the original ORTC algorithm, as shown in FIG. 2(d).

FIFA-S:

In some embodiments, FIFA-S is implemented for updating the aggregated FIB. FIFA-S keeps the aggregated FIB size optimal after every update. A naive way to do so is to perform the ORTC aggregation on the entire FIB trie upon every update, but this would be too time-consuming. A better approach is to update only those parts of the FIB trie that may have been impacted by the update. This approach is implemented, for comparison, in both the optimal size update handling algorithm (BasicOptSize), proposed by some of the present inventors (Y. Liu et al. "Incremental forwarding table aggregation," in *Proc. IEEE Globecom*, 2010) and incorporated in its entirety herein, and FIFA-S, but FIFA-S is eight times faster than BasicOptSize (as is shown below in the "Evaluation" section) and its heaviest FIB burst (i.e., number of FIB changes caused by a single route change) is only 1/10 of that in BasicOptSize. Below the BasicOptSize algorithm is first described, and then FIFA-S, which includes improvements to BasicOptSize, is described.

The BasicOptSize algorithm goes through the following steps, after applying the update to the corresponding node:
1) Step A: on the subtree rooted at the updated node, merge the next-hops using a depth-first traversal in post-order. This is basically a Round One operation on a subtree;
2) Step B: for each ancestor node above the updated node, merge its next-hops until the node's new next-hop set is the same as its old next-hop set. We call the changed node the "highest changed node";
3) Step C: on the subtree rooted at the highest changed node, select the next-hops using a depth-first traversal in pre-order. This is a Round Two operation on a subtree.

Figure 4:
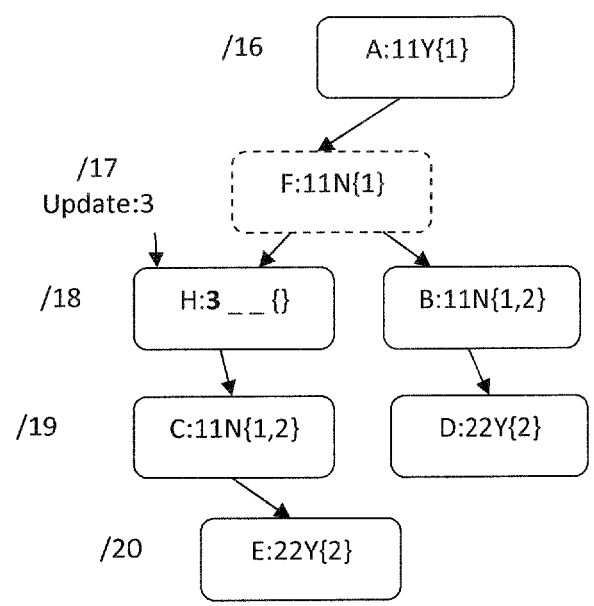
FIG. 4 is a Patricia Trie after receiving an updated FIB entry, in accordance with embodiments of the present disclosure.

To illustrate the BasicOptSize algorithm, we add a new entry to our example FIB (H in Table II(a)). FIG. 4 shows the FIB trie after updating node H (its type is changed to REAL and its next-hop from 1 to 3). FIG. 5 shows Steps A, B and C. After Step C, the aggregated FIB contains three of the five original entries, A, D, and E, as well as a new entry G (see Table II(b)).

TABLE II

UNAGGREGATED AND AGGREGATED FIB
ENTRIES AFTER AN UPDATE

| Label | Prefix | Next Hop |
|---|---|---|
| (a) Original FIB Entries | | |
| A | 141.225.0.0/16 | 1 |
| B | 141,225.64.0/18 | 1 |
| C | 141.225.32.0/19 | 1 |
| D | 141,225.96.0/19 | 2 |
| E | 141,225,48.0/20 | 2 |
| H | 141.225.0.0/18 | 3 |
| (b) Aggregated FIB Entries | | |
| A | 141.225,0,0/16 | 1 |
| D | 141.225.96.0119 | 2 |
| E | 141.225,48.0/20 | 2 |
| G | 141.225.0.0119 | 3 |

FIG. 5 shows that Steps B and C need to update the entire subtree rooted at H and F, respectively. To reduce the number of nodes visited on these subtrees, embodiments of the present disclosure utilize FIFA-S, which takes advantage of the following two properties:

Property 1: The result of Step A will be the same without updating any subtrees rooted at REAL nodes.

Property 2: The result of Step C will be the same without updating any subtree with these properties: (1) the next-hop sets did not change in any nodes on the subtree in Step B; and (2) the selected next-hop of the subtree root did not change.

Moreover, FIFA-S adopts the following rules and it has considerably fewer FIB changes than BasicOptSize (as is shown below in "Evaluation").

Property 3: In Step C, selecting a node's next-hop from its next-hop set using the following prioritized rules can reduce the number of FIB changes: (a) the next-hop selected by the nearest ancestor with status IN_FIB (this is for FIB size optimization); (b) the old selected next-hop; (c) the original next-hop, • and (d) if none of those are found in the next-hop set, sort the set and pick the first one instead of random selection.

The improved procedures are referred to herein as Step A, B' and C'. FIGS. 5 and 6 show that (1) BasicOptSize and FIFA-S have the same aggregation results; (2) E was skipped in Step A'; and (3) D and E were skipped in Step C.

FIGS. 7a through 7f (Procedures 1-6) illustrate the pseudo code of FIFA-S. Function mergeNexthopsBelowNode corresponds with Step A', mergeNexthopsAboveNode corresponds with Step B' and selectNexthop corresponds with Step C'. Note that we associate a flag optimal with each node to indicate whether Step C' is needed in the subtree of this node.

Properties 1-3 (shown in FIGS. 7a-7c) can be used in FIFA-T and FIFA-H to reduce computation overhead and keep the aggregated trie stable.

FIFA-T:

In some embodiments, FIFA-T is utilized, which shortens the FIB update time by localizing the changes on the FIB trie while maintaining strong forwarding correctness. The trade-off is that the FIB size will not be optimal. As more updates come, the FIB size will increase until it reaches a threshold, e.g., 90% of the FIB memory in the line card. At this point, a re-aggregation is performed on the FIB trie from the root to optimize the FIB size. On the surface, FIFA-T is very similar to the minimal time update handling algorithm (BasicMinTime) proposed by Y. Liu et al. in "Incremental forwarding table aggregation," Proc. IEEE Globecom, 2010. However, there are two important differences that make FIFA-T more efficient: (a) FIFA-T utilizes properties 1-3 described above with respect to FIFA-S; and (b) FIFA-T's re-aggregation is performed on the aggregated FIB trie, while BasicMinTime has to destroy the old aggregated FIB trie, and build a new one from the unaggregated FIB. Utilizing FIFA-T requires 40% less time than BasicMinTime and generates only 1.1 FIB changes per routing update.

FIFA-T is performed as follows:

(1) before the threshold is reached, perform the following (the less efficient procedures in BasicMinTime are called Step X and Y):

Step X': on the subtree rooted at the updated node, merge the next-hops using a depth-first traversal in post-order, skipping REAL nodes and their subtrees (based on Property 1);

Step Y': on the subtree rooted at the updated node, select the next-hops (following rules based on Property 3) using a depth-first traversal in pre-order, skipping REAL nodes with optimal flag set to 1 as well as their subtrees (based on Property 2).

Figure 8A:
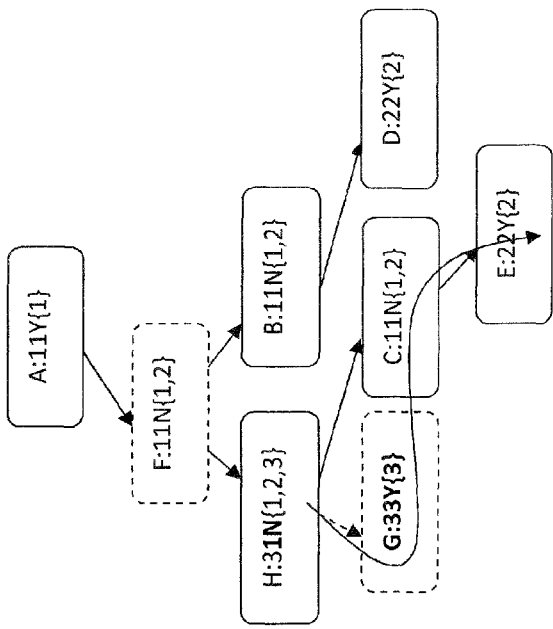
Figure 8B:
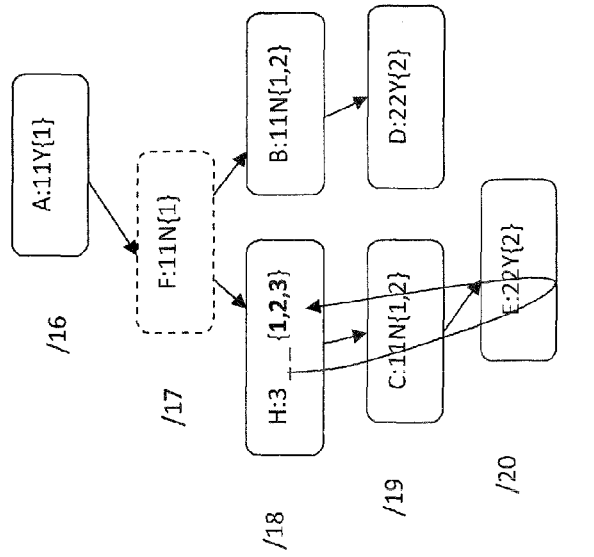

(2) when the threshold is reached, re-aggregate the trie from its root incorporating the three properties to obtain an optimal trie. The pseudo code for FIFA-T is illustrated in FIGS. 7a, 7g and 7c-7f (Procedures 1, 7, and 3-6). FIG. 8 illustrates the differences between BasicMinTime and FIFA-T, e.g., node E was skipped in Step X' and Y'.

Figure 9D:
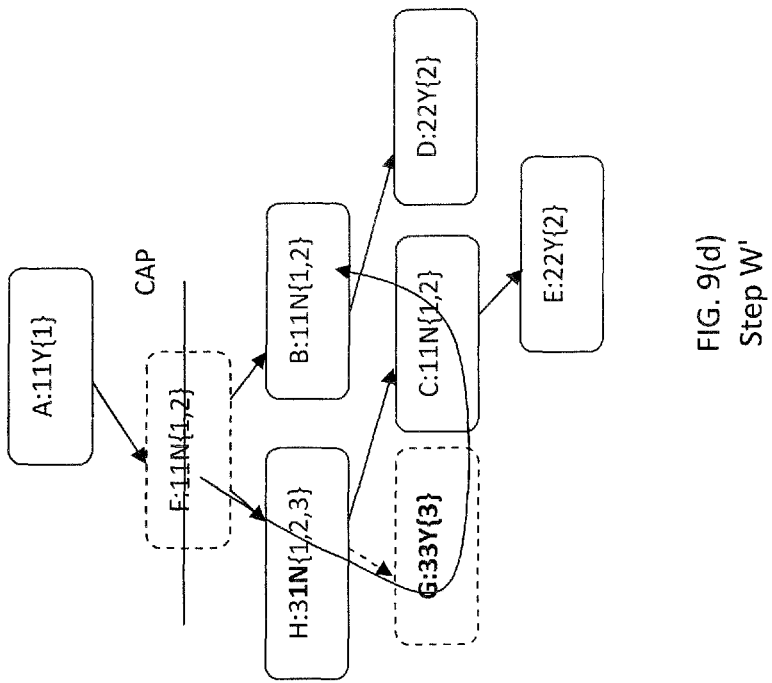
Figure 9C:
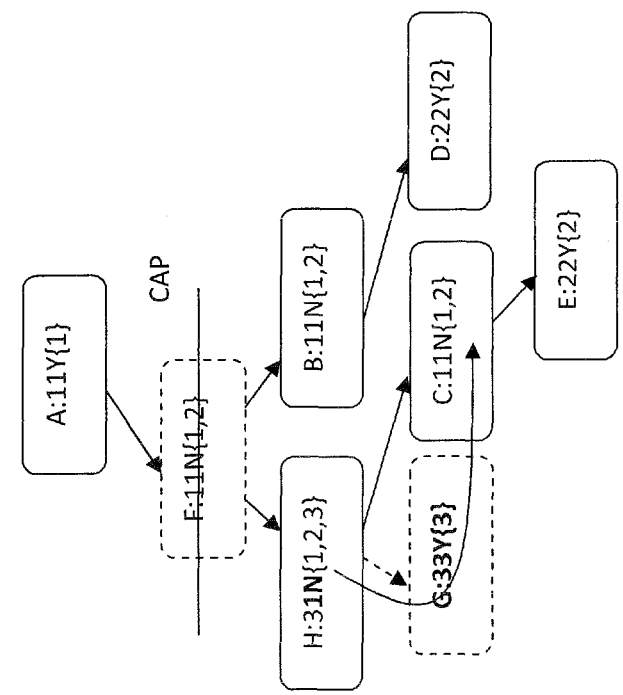

FIFA-H:

In addition to FIFA-S and FIFA-T, some embodiments of the present disclosure utilize FIFA-H, a hybrid scheme that achieves a good balance among aggregation speed, FIB size and number of FIB changes. In this approach, a FIB size threshold and a CAP are set at the beginning. For each update, FIFA-H performs three steps (U, V, W (or W')) as follows (shown in FIG. 9):

Step U: merge the next-hops below the updated node (same as Step A' in FIFA-S and Step X' in FIFA-T);

Step V: merge the next-hops above the updated node up to the highest changed node whose prefix length is less than or equal to CAP, called the CAP node, which limits the computation overhead and the number of FIB changes compared to FIFA-S; and Step W or W': if the threshold is not reached, this step (W) performs next-hop selection on the subtree rooted at the current updated node (Save Time mode). Otherwise, this step (W') will start from the CAP node for next-hop selection (ReduceSize mode).

FIFA-H incurs less computation time and fewer FIB changes than FIFA-S, and has smaller FIB bursts than FIFA-T (as is shown in the "Evaluation" section, below). It has no lengthy re-aggregations, thus avoiding potential problems during re-aggregation, e.g., packet losses.

Evaluation:

In this section, the performance improvement of FIFA is evaluated over BasicOptSize, BasicMinTime, as well as SMALTA (see Z. A. Uzmi et al. "SMALTA: practical and near-optimal FIB aggregation," in Proc. CoNEXT, 2011, the entire contents of which is incorporated herein by reference), another ORTC-based FIB aggregation scheme. We also compare the three FIFA algorithms.

A. Methodology

We used RIBs and routing updates from Jan. 1, 2011 to Dec. 31, 2011 in the Routeviews route-views2 data archive. Since the routing updates do not contain nexthop IP address information, we use nexthop ASes to approximate nexthop routers and we have used internal routing information from a tier-1 ISP to verify that the approach closely approximates the results. In order to show the worst-case performance, we present the results from 4.69.184.193, a router in the tier-1 ISP Level 3, because this router has the most number of AS neighbors (2876 and 3151 on Jan. 1, 2011 and Dec. 31, 2011, respectively) among all 36 routers. In general, more neighbors means more next-hops the prefixes can have, which may lead to lower FIB aggregation performance. In practice, a router has tens or at most hundreds of interfaces.

We use the following four performance metrics: (1) FIB Size: total number of entries in FIB; (2) Time Cost: time to apply routing changes to the FIB including re-aggregation time, if any; (3) FIB Changes: total number of FIB updates caused by all routing updates; and (4) FIB burst: number of FIB changes caused by one route change. The evaluation was done on a machine with an Intel Core 2 Quad 2.83 GHz CPU.

Figures 10A, 10B, 10C:
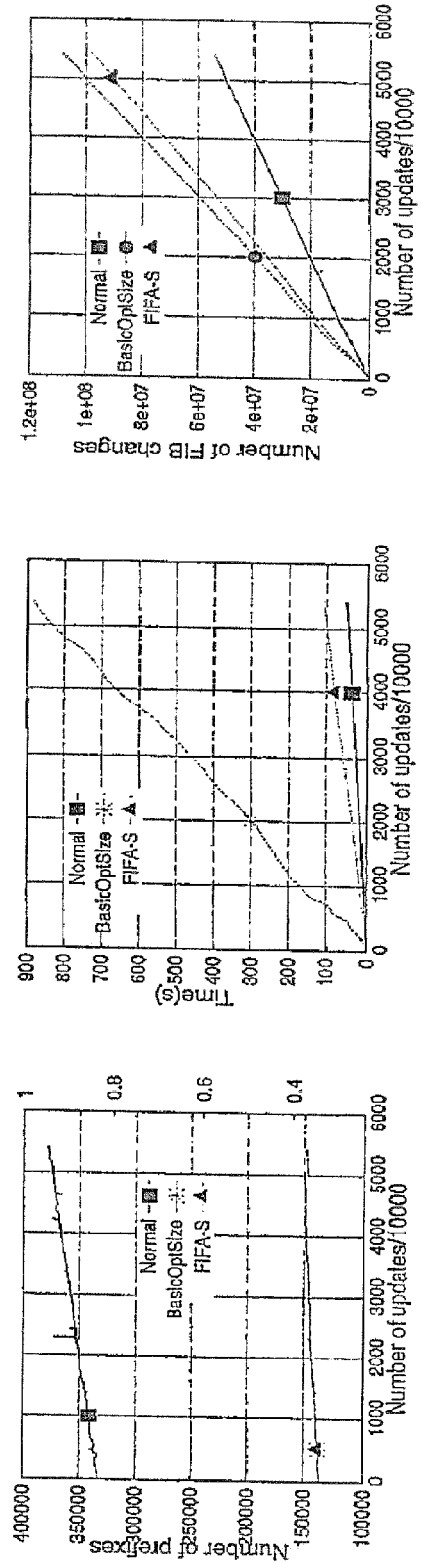
FIGS. 10a-10b are a set of plots comparing FIFA-S with the BasicOptSize algorithm, in terms of FIB size, time cost and FIB changes.

B. FIFA-S vs. BasicOptSize We first compare FIFA-S with BasicOptSize. FIG. 10(a) shows the FIB size. Since both schemes achieve optimal FIB size, their lines overlap with each other ending below 150,000. The top line shows the unaggregated FIB size, which increased from 332,588 to 378,728 during the year. In other words, either scheme reduced the FIB size by about 60%. If the unaggregated FIB size increases at the current rate (about 13.9%), it will take 7.5 more years for the aggregated FIB size to reach the current unaggregated FIB size (as of Dec. 31, 2011).

FIG. 10(b) shows that FIFA-S is more than 8.22 times faster (108 s in total or 2 µs/update) than BasicOptSize (888 s in total or 16.4 µs/update). The time cost of FIFA-S is very close to the bottom line, which corresponds to the time cost to update an unaggregated FIB. This suggests that FIFA-S may feasibly be deployed in an operational router.

FIG. 10(c) shows that the total number of FIB changes in FIFA-S is only about 1.8 times of that in an unaggregated FIB, and this ratio is very stable.

Table III (shown in FIG. 11) shows the FIB burst distribution. In both schemes, about 98% of the FIB bursts have no more than 10 FIB changes. Moreover, FIFA-S' largest FIB burst (568) is less than 10% of that in BasicOptSize (6,226).

C. FIFA-T Vs. BasicMinTime

Comparisons of FIFA-T with BasicMinTime are shown in FIG. 12 and Table IV (FIG. 13). The comparisons result in the following observations: (a) their FIB size oscillates between the optimal size and the configured threshold, and FIFA-T triggers only 9 fast re-aggregations during the entire year (FIG. 12(a)); (b) FIFA-T uses about 40% less time than BasicMinTime (FIG. 12(b)); and (c) FIFA-T's largest FIB burst is much smaller than that in BasicMinTime (FIG. 13).

Figures 15A, 15B, 15C:
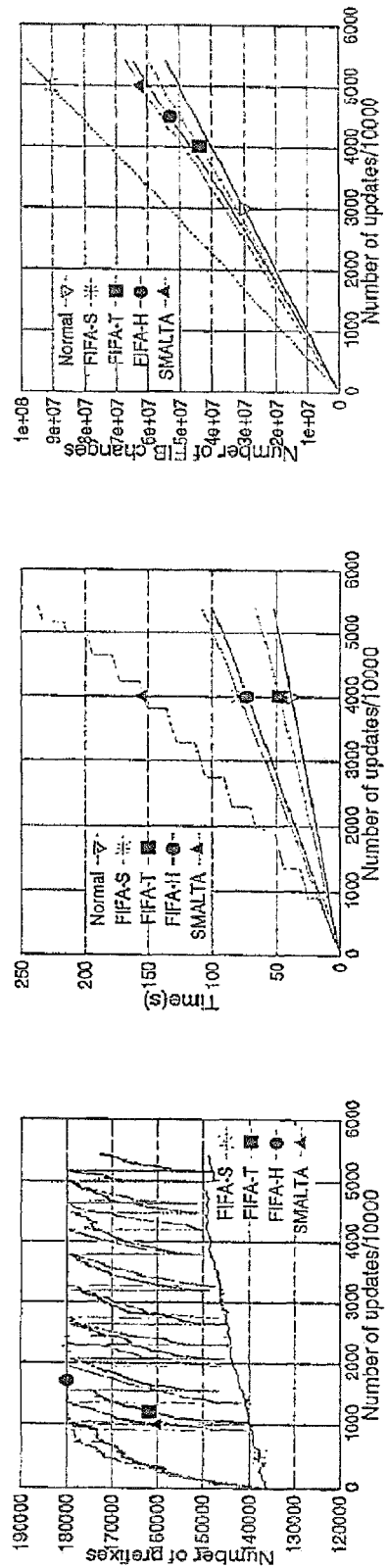
FIGS. 15a-15c are a set of plots comparing the three FIFA algorithms with SMALTA, in terms of FIB size, time cost and FIB changes.

D. Comparison Among FIFA Algorithms and with SMALTA a) FIB Size: FIG. 15(a) shows that: (1) FIFA-S has the smallest FIB size; (2) FIFA-T and SMALTA oscillate between the optimal size and the threshold, and (3) FIFA-H tends to stay around the threshold with no re-aggregation.

b) Time Cost: FIG. 15(b) shows that: (1) SMALTA takes the most time (237.23 s), which includes 11 full tree re-aggregations (158.62 s or 14.3 s per re-aggregation); (2) FIFA-T is the fastest (66 s), which includes 9 fast tree re-aggregations with 0.2 s for each (FIFA-T is 70 times faster than SMALTA in re-aggregation efficiency); and (3) FIFA-S(108 s) and FIFA-H (100 s) have similar time cost.

c) FIB Changes: FIG. 15(c) shows that: (1) FIFA-T and FIFA-S have the lowest and highest total number of FIB changes, respectively; (2) SMALTA has slightly more total number of FIB changes than FIFA-FI.

d) FIB Bursts: Table V (FIG. 14) shows that: (1) most route changes cause zero or one FIB change, and about 99% FIB bursts have less than 10 FIB changes; (2) FIFA-T usually has small FIB bursts, but they can become very large (69,526); (3) with FIFA-S and FIFA-H, the FIB bursts have at most 568 and 1,182 FIB changes, respectively; and (4) SMALTA has the largest FIB burst (72,856).

E. Summary

FIFA-S improves the time efficiency of BasicOptSize by 8.22 times and keeps the FIB size optimal. Thus, FIFA-S may be particularly useful when the FIB memory size is close to its optimal aggregated size, when FIFA-T will trigger too many re-aggregations. FIFA-T is the fastest among the three schemes; it may be particularly useful when the FIB memory is much larger than the optimal aggregated size. FIFA-H is a well-balanced scheme with medium running time and FIB burst size. Compared with SMALTA, all FIFA algorithms are faster and have smaller FIB bursts. In addition, FIFA-T and FIFA-H incur fewer total number of FIB changes than SMALTA.

The FIB aggregation methods provided herein may be performed by one or more processors coupled with any networking device, real or virtual. As is readily understood by those skilled in the field of the present disclosure, a network may be a virtual network, with virtual routers in the network represented by, and performing operations in accordance with, a set of software instructions which are executed by one or more processors of a general-purpose computer. For example, Appendix A (J. P. Abraham et al., "A Flexible Quagga-based Virtual Network With FIB Aggregation"), the contents of which are incorporated herein by reference, demonstrates the implementation of FIB aggregation techniques provided by the present disclosure in such a virtual network. As shown in Appendix A, the FIB aggregation methods provided by the present disclosure may be implemented in real routing software, utilizing a real network topology and real routing updates to model and evaluate the performance of real routers with FIB aggregation in a real network.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A networking device comprising a processor and a routing protocol, said processor operable to:
   access entries in a forwarding information base (FIB), each of said FIB entries comprising an address prefix and an associated selected next-hop; and
   aggregate the FIB entries to produce an aggregated FIB with strong forward correctness, wherein, in aggregating the FIB entries, the processor is further operable to:
   (a) associate the FIB entries with nodes (n) in a patricia trie;
   (b) traverse the patricia trie depth-first in post-order and determine for each node a next-hop set, without expanding the trie, by merging what would be the next-hop sets of its imaginary children nodes if there is a complete binary tree; and
   (c) traverse the patricia trie depth-first in pre-order, select for the root node a next-hop from its next-hop set and include the FIB entry associated with the root node in the aggregated FIB,
   for each node having a selected next-hop that appears in its child's next-hop set, select that next-hop for the child as its next-hop and exclude the FIB entry associated with the child node from the aggregated FIB,
   for each child node which does not have in its next-hop set the selected next-hop of its parent, select a next-hop from its next-hop set and include the FIB entry associated with the child node in the aggregated FIB; and
   forward a data packet according to the aggregated FIB.

2. The networking device of claim 1, wherein the processor is further operable to:
   create a new child node under a traversed node if the traversed node has an original next-hop that is different than its selected next-hop and the traversed node has a child node with prefix length of at least two greater than the prefix length of the traversed node; and
   create a new child node under a traversed node if the traversed node has an original next-hop that is different than its selected next-hop and the traversed node only has one child node.

3. The networking device of claim 1, wherein for each node (n), in merging what would be the next-hop sets of its imaginary children nodes if there is a complete binary tree at step (b), the processor is operable to:
   determine a next-hop set of n's imaginary left child $(S_l(n))$, as follows:
   if there is no actual left child, $S_l(n)$ is the original next-hop of the node (n);
   if the difference between the prefix length of the node (n) and that of its actual left child is 1, then $S_l(n)$ is the next-hop set of the actual left child;
   if the difference between the prefix length of the node (n) and that of its actual left child is 2, then $S_l(n)$ is the merged next-hops of the original next-hop of the node (n) and the next-hop set of the actual left child;
if the difference between the prefix length of the node (n) and that of its actual left child is greater than 2, then $S_l(n)$ is the original next-hop of the node (n);
determine a next-hop set of n's imaginary right child ($S_r(n)$), as follows:
if there is no actual right child, $S_r(n)$ is the original next-hop of the node (n);
if the difference between the prefix length of the node (n) and that of its actual right child is 1, then $S_r(n)$ is the next-hop set of the actual right child;
if the difference between the prefix length of the node (n) and that of its actual right child is 2, then $S_r(n)$ is the merged next-hops of the original next-hop of the node (n) and the next-hop set of the actual right child;
if the difference between the prefix length of the node (n) and that of its actual right child is greater than 2, then $S_r(n)$ is the original next-hop of the node (n); and
determine a next-hop set for node (n), without expanding the trie, by merging $S_l(n)$ and $S_r(n)$.

4. The networking device of claim 1, wherein the processor operably produces the aggregated FIB in a control plane of the networking device and communicates the aggregated FIB to a data plane of the networking device.

5. The networking device of claim 4, wherein the aggregated FIB communicated to the data plane is installed in a line card.

6. The networking device of claim 1, wherein the processor is further operable to:
(d) receive a routing update, including an updated FIB entry;
(e) update a node of the patricia trie corresponding with the updated FIB entry;
(f) on the subtree rooted at the updated node, perform step (b) to update only those subtrees rooted at non-real nodes;
(g) for each ancestor node above the update node, merge its next-hops until the node's new next-hop set is the same as its old next-hop set; and
(h) on the subtree rooted at the highest changed node after completing step (g), select for each node a next-hop from its next-hop set by performing step (c),
wherein, step (h) is not performed for any subtree with the following properties: the next-hop sets did not change in any nodes on the subtree in step (g), and the selected next-hop of the subtree root did not change,
wherein, a node's next-hop is selected from its next-hop set in step (h) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

7. The networking device of claim 1, wherein the processor is further operable to:
(i) receive a routing update, including an updated FIB entry;
(j) update a node of the patricia trie corresponding with the updated FIB entry;
(k) on the subtree rooted at the updated node, perform step (b) to update only those subtrees rooted at non-real nodes;
(l) on the subtree rooted at the updated node, after completing step (k), select for each node a next-hop from its next-hop set by performing step (c),
wherein, step (l) is not performed for any subtree with the following properties: the next-hop sets did not change in any nodes on the subtree in step (g), and the selected next-hop of the subtree root did not change,
wherein, a node's next-hop is selected from its next-hop set in step (l) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

8. The networking device of claim 7, wherein the processor is further operable to:
determine if a size of the aggregated FIB has reached a pre-determined threshold and, if so, re-aggregate the FIB by performing steps (k) and (l) from the patricia trie's root node, instead of an updated node.

9. The networking device of claim 1, wherein the processor is further operable to:
(m) receive a routing update, including an updated FIB entry;
(n) update a node of the patricia trie corresponding with the updated FIB entry;
(o) on the subtree rooted at the updated node, perform step (b) to update only those subtrees rooted at non-real nodes;
(p) for each ancestor node above the update node, up to a highest changed node whose prefix length is less than or equal to the prefix length of a pre-determined node (CAP node), merge its next-hops until the node's new next-hop set is the same as its old next-hop set;
(q) determine if a size of the aggregated FIB has reached a pre-determined threshold; and
(r) if the pre-determined threshold has not been reached, then on the subtree rooted at the updated node after completing step (o), select for each node a next-hop from its next-hop set by performing step (c), and if the pre-determined threshold has been reached, then on the subtree rooted at the CAP node after completing step, select for each node a next-hop from its next-hop set by performing step (c),
wherein, next-hop selection of step (r) is not performed for any subtree with the following properties: the next-hop sets did not change in any nodes on the subtree in step (g), and the selected next-hop of the subtree root did not change,
wherein, a node's next-hop is selected from its next-hop set in step (r) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

10. A method for forwarding information base (FIB) aggregation, comprising:
initiating, by a processor of a network device, a routing protocol;
accessing, by the processor of the networking device, entries in a forwarding information base (FIB), each of said FIB entries comprising an address prefix and an associated selected next-hop; and
aggregating the FIB entries to produce an aggregated FIB with strong forward correctness, by:

(a) associating the FIB entries with nodes (n) in a patricia trie;

(b) traversing the patricia trie depth-first in post-order and determining for each node a next-hop set, without expanding the trie, by merging what would be the next-hop sets of its imaginary children nodes if there is a complete binary tree; and (c) traversing the patricia trie depth-first in pre-order, selecting for the root node a next-hop from its next-hop set and including the FIB entry associated with the root node in the aggregated FIB, for each node having a selected next-hop that appears in its child's next-hop set, selecting that next-hop for the child as its next-hop and excluding the FIB entry associated with the child node from the aggregated FIB, for each child node which does not have in its next-hop set the selected next-hop of its parent, selecting a next-hop from its next-hop set and including the FIB entry associated with the child node in the aggregated FIB; and forwarding a data packet according to the aggregated FIB.

11. The method of claim 10, further comprising:

creating a new child node under a traversed node if the traversed node has an original next-hop that is different than its selected next-hop and the traversed node has a child node with prefix length of at least two greater than the prefix length of the traversed node; and creating a new child node under a traversed node if the traversed node has an original next-hop that is different than its selected next-hop and the traversed node only has one child node.

12. The method of claim 10, wherein for each node (n), in merging what would be the next-hop sets of its imaginary children nodes if there is a complete binary tree at step (b) further comprises:

determining a next-hop set of n's imaginary left child ($S_l(n)$), as follows:

if there is no actual left child, $S_l(n)$ is the original next-hop of the node (n);

if the difference between the prefix length of the node (n) and that of its actual left child is 1, then $S_l(n)$ is the next-hop set of the actual left child;

if the difference between the prefix length of the node (n) and that of its actual left child is 2, then $S_l(n)$ is the merged next-hops of the original next-hop of the node (n) and the next-hop set of the actual left child;

if the difference between the prefix length of the node (n) and that of its actual left child is greater than 2, then $S_l(n)$ is the original next-hop of the node (n);

determining a next-hop set of n's imaginary right child ($S_r(n)$), as follows:

if there is no actual right child, $S_r(n)$ is the original next-hop of the node (n);

if the difference between the prefix length of the node (n) and that of its actual right child is 1, then $S_r(n)$ is the next-hop set of the actual right child;

if the difference between the prefix length of the node (n) and that of its actual right child is 2, then $S_r(n)$ is the merged next-hops of the original next-hop of the node (n) and the next-hop set of the actual right child;

if the difference between the prefix length of the node (n) and that of its actual right child is greater than 2, then $S_r(n)$ is the original next-hop of the node (n); and determining a next-hop set for node (n), without expanding the trie, by merging $S_l(n)$ and $S_r(n)$.

13. The method of claim 10, wherein the aggregated FIB is produced in a control plane of the networking device and is communicated to a data plane of the networking device.

14. The method of claim 13, wherein the aggregated FIB communicated to the data plane is installed in a line card.

15. The method of claim 10, further comprising:

(d) receiving a routing update, including an updated FIB entry;

(e) updating a node of the patricia trie corresponding with the updated FIB entry;

(f) on the subtree rooted at the updated node, performing step (b) to update only those subtrees rooted at non-real nodes;

(g) for each ancestor node above the update node, merging its next-hops until the node's new next-hop set is the same as its old next-hop set; and (h) on the subtree rooted at the highest changed node after completing step (g), selecting for each node a next-hop from its next-hop set by performing step (c), wherein, step (h) is not performed for any subtree with the following properties: the next-hop sets did not change in any nodes on the subtree in step (g), and the selected next-hop of the subtree root did not change, wherein, a node's next-hop is selected from its next-hop set in step (h) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

16. The method of claim 10, further comprising:

(i) receiving a routing update, including an updated FIB entry;

(j) updating a node of the patricia trie corresponding with the updated FIB entry;

(k) on the subtree rooted at the updated node, performing step (b) to update only those subtrees rooted at non-real nodes;

(l) on the subtree rooted at the updated node, after completing step (k), selecting for each node a next-hop from its next-hop set by performing step (c), wherein, step (l) is not performed for any subtree with the following properties: the next-hop sets did not change in any nodes on the subtree in step (g), and the selected next-hop of the subtree root did not change, wherein, a node's next-hop is selected from its next-hop set in step (l) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

17. The method of claim 16, further comprising:

determining if a size of the aggregated FIB has reached a pre-determined threshold and, if so, re-aggregating the FIB by performing steps (k) and (l) from the patricia trie's root node, instead of an updated node.

18. The method of claim 10, further comprising:

(m) receiving a routing update, including an updated FIB entry;

(n) updating a node of the patricia trie corresponding with the updated FIB entry;

(o) on the subtree rooted at the updated node, performing step (b) to update only those subtrees rooted at non-real nodes;

(p) for each ancestor node above the update node, up to a highest changed node whose prefix length is less than or equal to the prefix length of a pre-determined node (CAP node), merging its next-hops until the node's new next-hop set is the same as its old next-hop set;

(q) determining if a size of the aggregated FIB has reached a pre-determined threshold; and (r) if the pre-determined threshold has not been reached, then on the subtree rooted at the updated node after completing step (o), selecting for each node a next-hop from its next-hop set by performing step (c), and if the pre-determined threshold has been reached, then on the subtree rooted at the CAP node after completing step, selecting for each node a next-hop from its next-hop set by performing step (c), wherein, next-hop selection of step (r) is not performed for any subtree with the following properties: the next-hop sets did not change in any nodes on the subtree in step (g), and the selected next-hop of the subtree root did not change, wherein, a node's next-hop is selected from its next-hop set in step (r) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

19. A non-transitory computer readable medium containing instructions for providing a method for forwarding information base (FIB) aggregation, enabled at least in part on a processor and a routing protocol of a computerized device, which when executed by the processor, performing the steps of:

accessing entries in a forwarding information base (FIB), each of said FIB entries comprising an address prefix and an associated selected next-hop; and aggregating the FIB entries to produce an aggregated FIB with strong forward correctness, by:

(a) associating the FIB entries with nodes (n) in a patricia trie;

(b) traversing the patricia trie depth-first in post-order and determining for each node a next-hop set, without expanding the trie, by merging what would be the next-hop sets of its imaginary children nodes if there is a complete binary tree; and (c) traversing the patricia trie depth-first in pre-order, selecting for the root node a next-hop from its next-hop set and including the FIB entry associated with the root node in the aggregated FIB, for each node having a selected next-hop that appears in its child's next-hop set; selecting that next-hop for the child as its next-hop and excluding the FIB entry associated with the child node from the aggregated FIB, for each child node which does not have in its next-hop set the selected next-hop of its parent, selecting a next-hop from its next-hop set and including the FIB entry associated with the child node in the aggregated FIB; and forwarding a data packet according to the aggregated FIB.

20. The non-transitory computer readable medium of claim 19, wherein the instructions, which when executed by the processor, further performing the steps of:

creating a new child node under a traversed node if the traversed node has an original next-hop that is different than its selected next-hop and the traversed node has a child node with prefix length of at least two greater than the prefix length of the traversed node; and creating a new child node under a traversed node if the traversed node has an original next-hop that is different than its selected next-hop and the traversed node only has one child node.

21. The non-transitory computer readable medium of claim 19, wherein the instructions, which when executed by the processor, further performing the steps of:

(d) receiving a routing update, including an updated FIB entry;

(e) updating a node of the patricia trie corresponding with the updated FIB entry;

(f) on the subtree rooted at the updated node, performing step (b) to update only those subtrees rooted at non-real nodes;

(g) for each ancestor node above the update node, merging its next-hops until the node's new next-hop set is the same as its old next-hop set; and (h) on the subtree rooted at the highest changed node after completing step (g), selecting for each node a next-hop from its next-hop set by performing step (c), wherein, step (h) is not performed for any subtree with the following properties: the next-hop sets did not change in any nodes on the subtree in step (g), and the selected next-hop of the subtree root did not change, wherein, a node's next-hop is selected from its next-hop set in step (h) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

22. The non-transitory computer readable medium of claim 19, wherein the instructions, which when executed by the processor, further performing the steps of:

(i) receiving a routing update, including an updated FIB entry;

(j) updating a node of the patricia trie corresponding with the updated FIB entry;

(k) on the subtree rooted at the updated node, performing step (b) to update only those subtrees rooted at non-real nodes;

(l) on the subtree rooted at the updated node, after completing step (k), selecting for each node a next-hop from its next-hop set by performing step (c), wherein, step (l) is not performed for any subtree with the following properties: the next-hop sets did not change in any nodes on the subtree in step (g), and the selected next-hop of the subtree root did not change, wherein, a node's next-hop is selected from its next-hop set in step (l) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

23. The non-transitory computer readable medium of claim 19, wherein the instructions, which when executed by the processor, further performing the steps of:

(m) receiving a routing update, including an updated FIB entry;

(n) updating a node of the patricia trie corresponding with the updated FIB entry;

(o) on the subtree rooted at the updated node, performing step (b) to update only those subtrees rooted at non-real nodes;

(p) for each ancestor node above the update node, up to a highest changed node whose prefix length is less than or equal to the prefix length of a pre-determined node (CAP node), merging its next-hops until the node's new next-hop set is the same as its old next-hop set;

(q) determining if a size of the aggregated FIB has reached a pre-determined threshold; and (r) if the pre-determined threshold has not been reached, then on the subtree rooted at the updated node after completing step (o), selecting for each node a next-hop from its next-hop set by performing step (c), and if the pre-determined threshold has been reached, then on the subtree rooted at the CAP node after completing step, selecting for each node a next-hop from its next-hop set by performing step (c), wherein, next-hop selection of step (r) is not performed for any subtree with the following properties: the next-hop sets did not change in any nodes on the subtree in step (g), and the selected next-hop of the subtree root did not change, wherein, a node's next-hop is selected from its next-hop set in step (r) using the following prioritized rules: (1) the next-hop selected by the nearest ancestor included in the aggregated FIB; (2) the old selected next-hop; (3) the original next-hop; and (4) if none of (1)-(3) apply, sort the next-hop set and select the first next-hop from the sorted set.

* * * * *